W. HAMMOND, Jr.
MOLDING MACHINE.
APPLICATION FILED AUG. 5, 1911.

1,048,689.

Patented Dec. 31, 1912.
6 SHEETS—SHEET 2.

Fig. 2.

Witnesses
Edwin L. Bradford
Wm. E. Dype

Inventor
Thomas W. Hammond Jr.
By 
his Attorneys

T. W. HAMMOND, Jr.
MOLDING MACHINE.
APPLICATION FILED AUG. 5, 1911.

1,048,689.

Patented Dec. 31, 1912.
6 SHEETS—SHEET 3.

Fig. 3.

T. W. HAMMOND, Jr.
MOLDING MACHINE.
APPLICATION FILED AUG. 5, 1911.

1,048,689.

Patented Dec. 31, 1912.
6 SHEETS—SHEET 4.

Witnesses
Edwin L. Bradford

Inventor
Thomas W. Hammond Jr.
By Ritter & Ritter
his Attorneys

T. W. HAMMOND, Jr.
MOLDING MACHINE.
APPLICATION FILED AUG. 5, 1911.

1,048,689.

Patented Dec. 31, 1912.
6 SHEETS—SHEET 5.

T. W. HAMMOND, Jr.
MOLDING MACHINE.
APPLICATION FILED AUG. 5, 1911.

1,048,689.

Patented Dec. 31, 1912.

UNITED STATES PATENT OFFICE.

THOMAS W. HAMMOND, JR., OF TACOMA, WASHINGTON.

MOLDING-MACHINE.

1,048,689.  Specification of Letters Patent.  Patented Dec. 31, 1912.

Application filed August 5, 1911. Serial No. 642,476.

*To all whom it may concern:*

Be it known that I, THOMAS W. HAMMOND, Jr., a citizen of the United States, residing at Tacoma, in the county of Pierce and State of Washington, have invented certain new and useful Improvements in Molding-Machines; and I do hereby declare the following to be a full, clear, and exact description of the invention, such as will enable others skilled in the art to which it appertains to make and use the same.

The invention relates to machines for molding pipes and the like from cement, concrete or other plastic materials and has for its object to provide a machine of the character indicated involving mechanism, preferably located, to a large extent, below the floor level, and comprising a stationary platform upon which the operator stands, about which platform a rotary mold-carrying frame is adapted to be intermittently revolved, with means for raising and lowering the mold-carrying frame with respect to a rotary table driven by suitable mechanism, said table being provided with an interchangeable central section to adapt the machine to molds of different sizes, the table also being provided with means for locking a mold thereto and causing the same to revolve therewith about a central core which is adapted to be withdrawn by appropriate mechanism, at the proper time, downward and out of the molded pipe section, and to be returned into position through the table and into the next empty mold; an adjustable feed hopper adapted to be moved toward and from the central axis of the changing table to supply the material for pipes of different diameters, associated with means for positively feeding the material from the hopper into the mold; tamping mechanism involving one or more bars mounted for reciprocatory motion and lateral adjustment above the charging table, said bars being operated by a simple form of driving mechanism adapted to hold the tamping bars in frictional engagement and permit the same to automatically adjust themselves to the depth of the material in the mold; and means for controlling the operation of the mold carrying frame, the mold core, the feed of the material from the hopper and the operation of the tamping devices, all to be more particularly hereinafter described, and illustrated in a simple and convenient embodiment of the invention, in the accompanying drawings, in which, Fig. 4 is a sectional plan on the line 4—4 of Fig. 2.

Referring to the drawings, $a$ indicates the base of the machine, which is preferably formed of a metal casting, having secured thereto a series of vertical columns or supports $a'$, which latter project through the main floors represented by the beams $x$—$x$, upon which latter are mounted side frames $b$ which support the mold charging and tamping apparatus to be hereinafter more particularly described.

Supported at the forward end of the base plate $a$ is a stationary column or support $c$ upon the upper end of which is secured a platform $c'$ upon which the operator stands and from which he controls the complete operation of the machine. Journaled upon the column $c$ is a hollow shaft $e$, upon the lower end of which is mounted a pinion $d^0$ by means of which the said hollow shaft $e$ is driven from an electric motor or similar prime mover $d$ mounted in brackets $a^3$ on the base plate $a$ through transmission mechanism comprising a gear $d'$ on the motor shaft meshing with a speed reducing pinion $d^2$ upon a countershaft $d^3$ journaled in bearings on the base plate and a worm $d^4$ on said shaft which meshes with a worm wheel $d^5$ mounted on the stub shaft $d^6$ journaled in a stepped bearing formed in the plate and having thereon a pinion $d^7$ meshing with said pinion $d^0$.

The hollow shaft $e$ rotates idly on the column $c$ until said shaft is elevated a slight distance by means of rock lever $g$ mounted in brackets $a^5$ on the base plate, which lever is adapted to be engaged by a pin $f^{10}$ on the core $f^8$, after the latter has been withdrawn downward from the mold, as will be hereinafter explained. The other end of said lever $g$ is provided with a sliding collar $g'$ surrounding the shaft $e$, said collar having a flange at its top to confine a stout helical spring $g^2$ between it and the corresponding collar on the shaft $e$, the parts being so arranged that when the lever $g$ is depressed the collar $g'$ compresses spring $g^2$ and elevates the shaft $e$ a short distance, sufficient to cause a flange $e'$ on the upper portion thereof to engage a corresponding flange on the base of a hollow sleeve $e^2$ surrounding the column $c$ and having rigidly secured to its upper end the mold carrying frame. The frictional engagement of the flanges on the hollow shaft sections $e$ and $e^2$ causes the latter section to be raised and then rotated with the former, thereby swinging the mold carrying frame, with the molds, in a rotary path about the column $c$ into charging and discharging positions.

Figure 1:
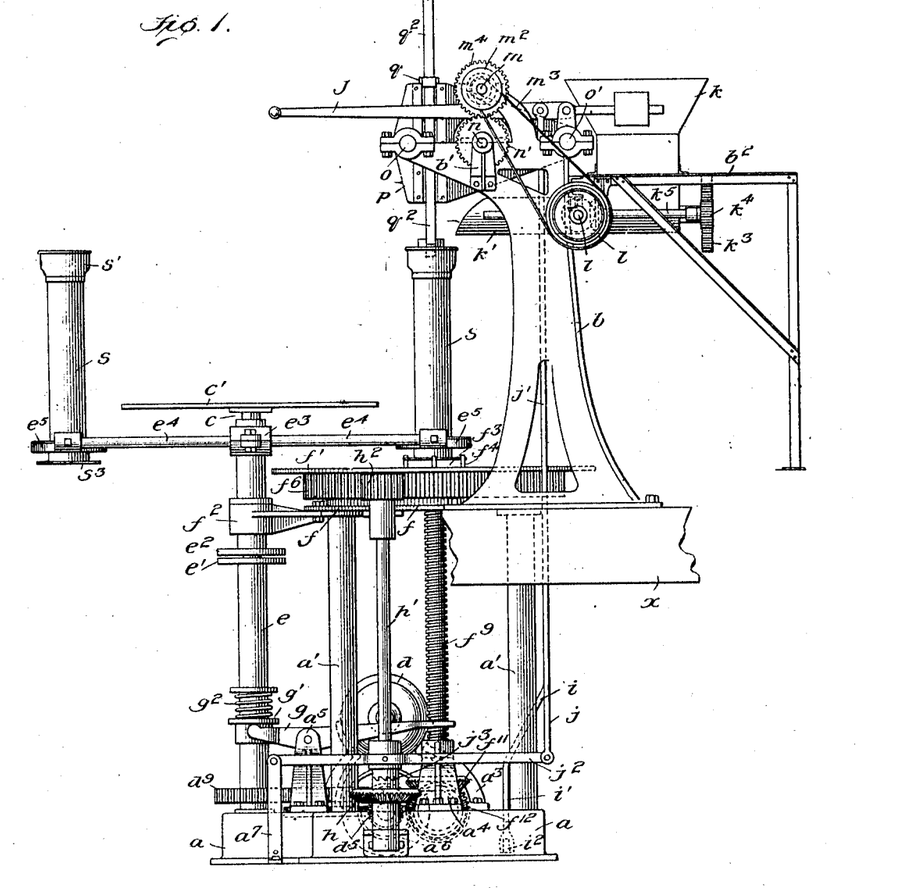
Figure 1 is a side elevation of the complete machine.
Figure 2:
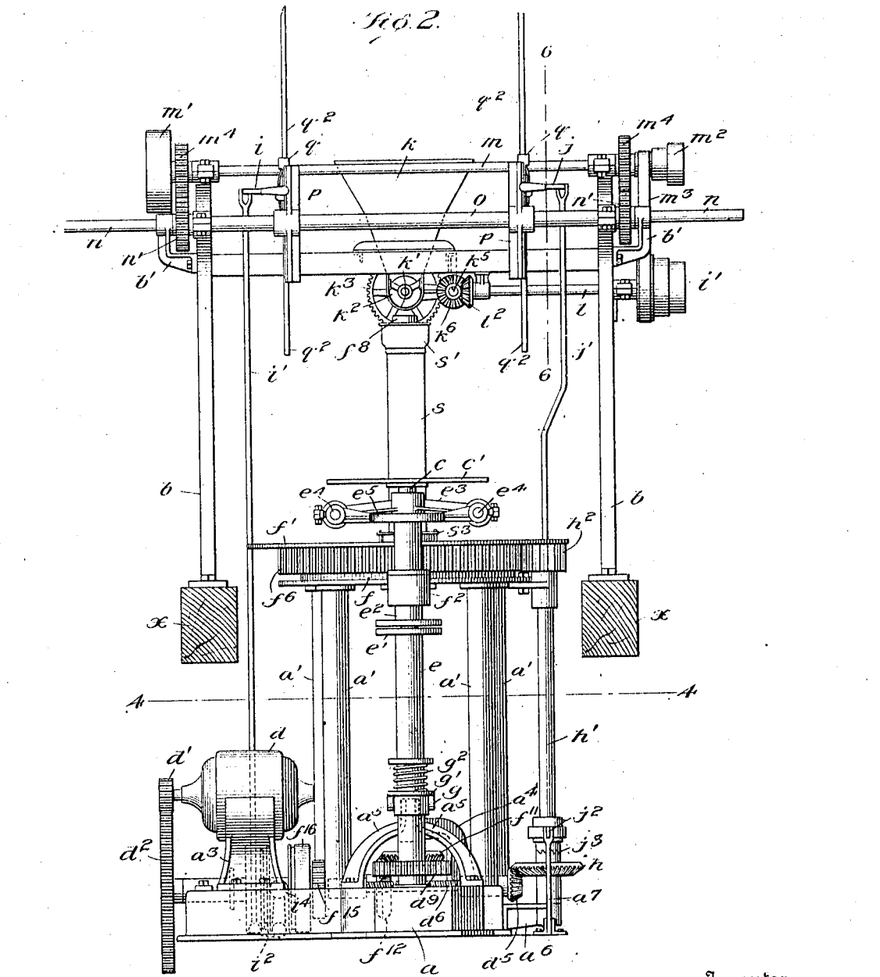
Fig. 2 is a front elevation thereof.
Figure 3:
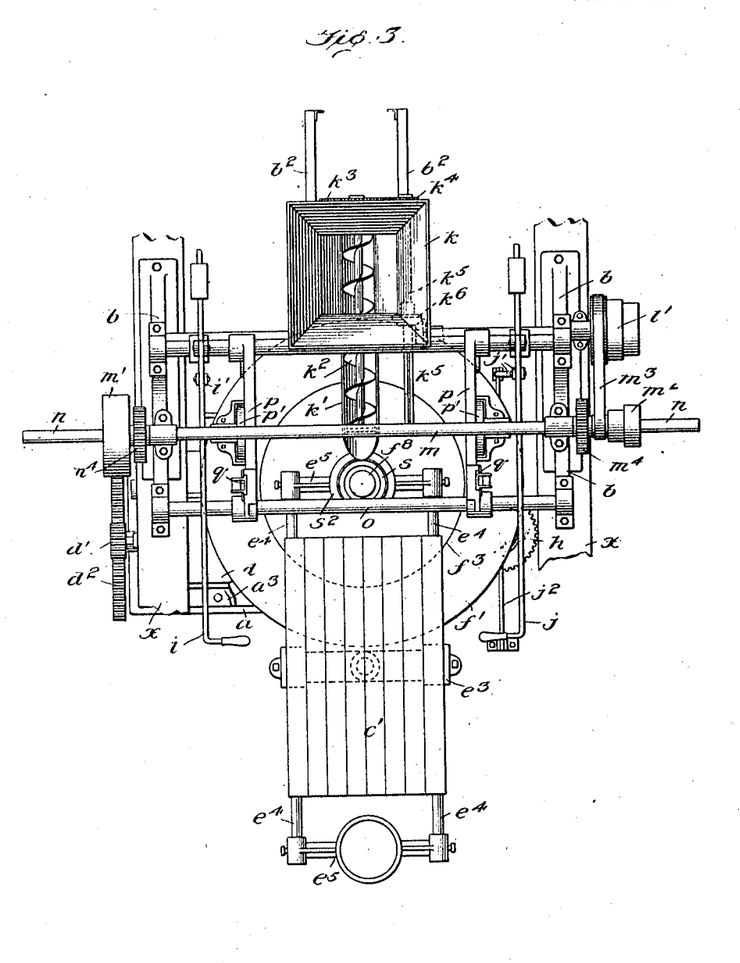
Fig. 3 is a plan view.
Figures 5, 14:
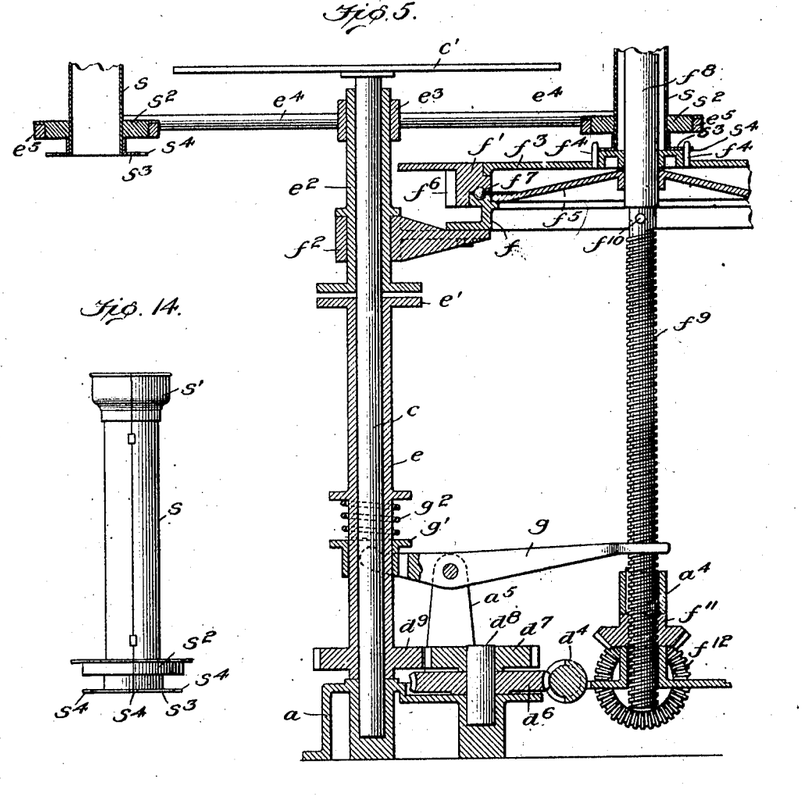
Fig. 5 is a sectional elevation on the line 5—5 of Fig. 4.

The mold carrying frame, which is secured to and revolves with the hollow shaft section $e^2$ consists of a middle yoke section $e^3$ having a collar intermediate its ends which is secured to the shaft section aforesaid, and two side arms or bars $e^4$ mounted in the ends of the yoke $e^3$ and two end yokes $e^5$, $e^5$ adjustably supported on the bars $e^4$ and each having a middle collar-like section adapted to embrace and support the molds in vertical position, particularly as shown in Figs. 1 and 5, and to permit said molds to rotate independently.

Mounted on the upper ends of the columns $a'$ is the charging table over which the mold-carrying frame is adapted to swing the molds in succession. Said charging table comprises a ring-shaped base piece $f$ secured to the column $a'$ aforesaid, provided on its upper rim with a raceway adapted to receive the antifriction rollers or balls $f^7$ which support a rotary ring section $f'$ having its periphery provided with gear teeth $f^6$ by means of which the said section is rotated. Centrally disposed within the ring section $f$ and supported by an annular flange thereon is a removable plate or spider $f^5$ which serves as an upper guide for the mold core $f^8$, as indicated more particularly in Fig. 5. Centrally disposed in the rim section $f'$ is a removable table section $f^3$ which is adapted to support the molds during the operation of casting and finishing the pipe sections. The central portion of said plate $f^3$ is elevated and provided with an orifice through which the core $f^8$ passes, the purpose of the elevation being to prevent the accumulation of sand or other matter which would tend to prevent the accurate centering of the mold.

Figure 12:
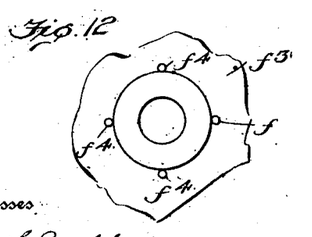
Fig. 12 is a fragmentary plan view of the middle portion of the removable central section of the charging table.
Figure 13:
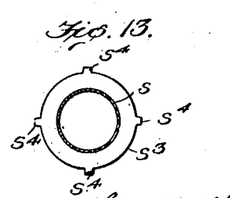
Fig. 13 is a sectional plan view of the bottom of one of the mold forms.

Said plate $f^3$ is also provided with a series of circumferentially spaced pins $f^4$ located about the periphery of the central elevation as shown in Figs. 5 and 12, which coöperate with certain lugs on the lower end of the molds to lock each mold to the table and cause it to partake of the rotary motion of said table. The purpose of making the sections $f^3$ and $f^5$ removable is to adapt the machine for the molding of pipes of various diameters, to effect which purpose several sets of plates having central openings of different sizes to accommodate the different sizes of the interchangeable cores $f^8$ are employed. The revoluble table top comprising the rim $f'$ and central section $f^3$ is driven by a gear $h^2$ meshing with the teeth $f^6$ on the rim section $f'$, said gear being mounted upon the vertical shaft $h'$ which has splined thereto one member of a clutch $j^3$, the other member of which is formed upon a bevel pinion $h$, which meshes with a bevel gear $d^5$ on the shaft $d^3$. Said clutch member $j^3$ is controlled from the hand lever $j$ mounted on the upper frame $b$ of the machine and accessible to the operator standing on the platform $c'$, said hand lever being connected by a link $j'$ to rod $j^2$ which is pivoted at one end to a bracket $a^7$ mounted on the base $a$ and swiveled at its mid-section to the movable member of clutch $j^3$. When the members of the clutch $j^3$ are engaged, the charging table is therefore driven to uniformly rotate the mold carried thereon about the core $f^8$. Secured to the lower face of the stationary rim $f$ of the charging table is a bracket piece $f^2$ which serves as an upper bearing and guide for the hollow shaft section $e$, as shown in Fig. 5.

The core $f^8$ which consists of a cylindrical upper section and a lower screw-threaded section, is mounted for reciprocatory motion in a yoke $a^4$ and an interiorly threaded bevel gear $f^{11}$ at its lower end and in the central openings of the plates $f^3$ and $f^5$ of the table at its upper end. The gear $f^{11}$ which operates the core is supported between a hollow lug on the base plate, through which the lower portion of the core passes, and yoke $a^4$ secured to the base plate. Said gear $f^{11}$ is driven at appropriate times to raise and lower the core by a mating bevel gear $f^{12}$ secured to a shaft $f^{13}$ journaled in suitable brackets on the base plate. The core $f^8$ accurately fits the central openings in the table sections $f^3$ and $f^5$ and said core and table sections may be removed and replaced by other similar parts of appropriate size to adapt the machine for molding pipe sections of different sizes and diameters.

Rotary motion is imparted to the shaft $f^{13}$ and thence to gears $f^{12}$, $f^{11}$ and core $f^8$, by means of a suitable friction driven reverse gear, from the main shaft $d^3$. To effect this object there is mounted upon the shaft $d^3$, two friction clutches $f^{16}$ and $f^{20}$ respectively, the movable inner members of which are adjusted simultaneously to engage one clutch and disengage the other. Shaft $f^{13}$ is connected with the free member of clutch $f^{16}$ by means of gears $f^{14}$ and $f^{15}$ while the free member of clutch $f^{20}$ is connected with said shaft $f^{13}$ by means of sprocket gearing $f^{17}$, $f^{18}$ and $f^{19}$. The clutches $f^{16}$ and $f^{20}$ are operated to disengage one and engage the other by means of cams $i^4$ mounted upon a shaft $i^3$ to the outer end of which is secured a bell crank $i^2$ connected by means of a pull rod $i'$ with a hand lever $i$ mounted on the upper portion of the machine and readily accessible to the operator on the platform $c'$. When the members of clutch $f^{20}$ are engaged, shaft $f^{13}$ is rotated in one direction to elevate the core $f^8$ and adjust the same in its proper central longitudinal alinement within the mold. When clutch $f^{16}$ is engaged, shaft $f^{13}$ is driven in the opposite direction by gears $f^{14}$ and $f^{15}$ to retract or withdraw the core from its position within the mold and at the same time to impart to said core a uniform downward movement which has the effect of accurately finishing and polishing the interior of the pipe section. When the hand lever $i$ is moved to intermediate position both of the clutches $f^{16}$ and $f^{20}$ are disengaged and no movement is imparted to the core $f^8$.

The means for charging the material into the mold comprises a hopper $k$ which is slidably and adjustably mounted upon a rearwardly projecting bracket $b^2$ secured to the side frames $b$, near the upper part of the machine. The lower portion of the hopper is provided with a discharge spout $k'$ in which works a feed screw $k^2$ driven by a pinion $k^3$ on the outer end thereof, meshing with a pinion $k^4$ on a countershaft $k^5$ which latter is splined for sliding movement through the hub of a bevel pinion $k^6$ which meshes with a driving pinion $l^2$ mounted upon a countershaft $l$. This arrangement admits of the driving connection for operating the feed screw being maintained at all times and for all adjustments of the hopper toward and from the central axis of the charging table, inasmuch as the shaft $k^5$ partakes of the sliding movement of the hopper and at the same time slides through the hub of its driving pinion $k^6$ to which it is splined.

The countershaft $l$ is provided at its end with a stepped belt pulley $l'$ connected by belting $m^3$ with a stepped pulley $m^2$ mounted upon a main drive shaft $m$, which latter is driven by means of a pulley $m'$ from any suitable source of power and which, of course, will be provided with suitable means for coupling and uncoupling it with respect to the power source.

Figures 6, 8, 9, 10:
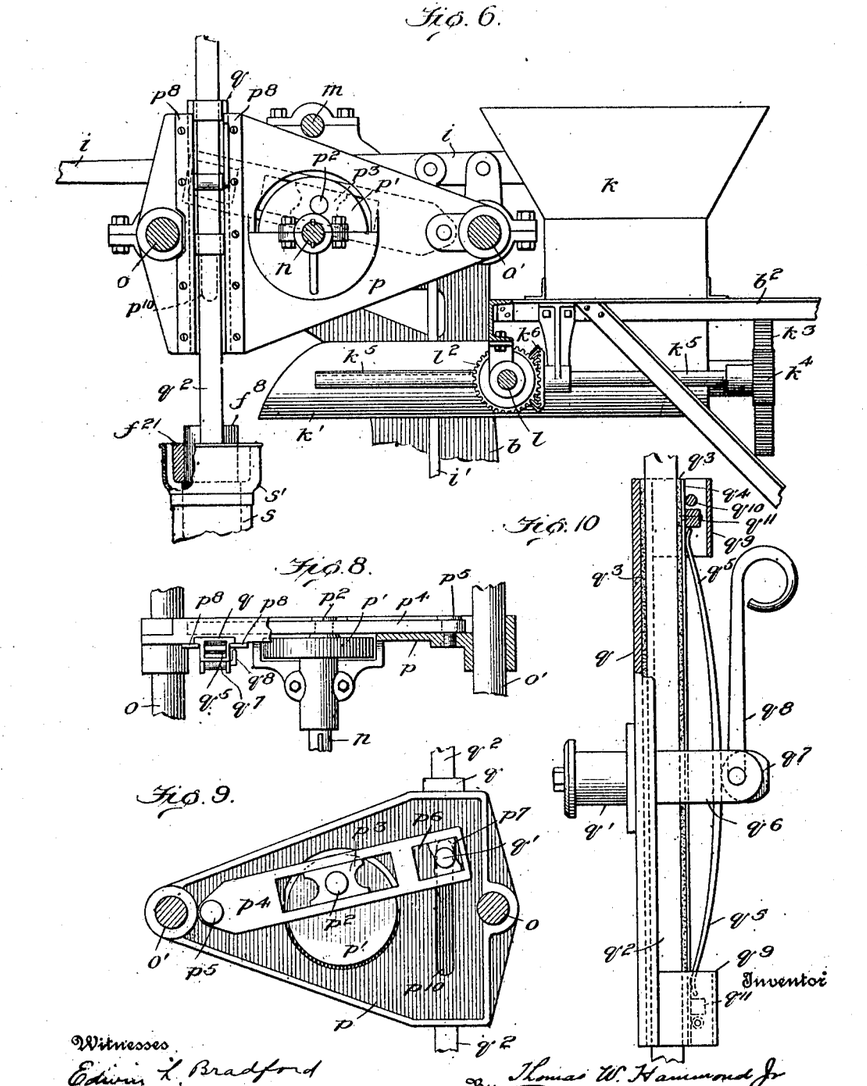
Fig. 6 is an enlarged side elevation of the upper part of the machine showing the feed hopper and tamping mechanism.
Fig. 8 is a detail plan view, partly in section, of one of the tamping devices.
Fig. 9 is a side elevation thereof.
Fig. 10 is a detail side elevation partly in section of one of the clamping slides for the tamping bars.
Figure 7:
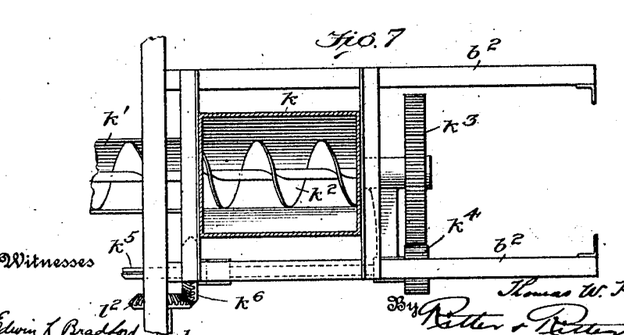
Fig. 7 is a plan view, partly in section, of the hopper mechanism.
Figure 11:
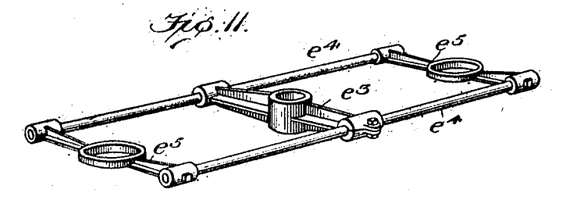
Fig. 11 is a perspective view of the mold carrying frame.

To provide for tamping or compacting the material as it is fed from the hopper into the mold, the machine is fitted with a plurality of tamping bars of a novel construction and mode of operation. Fixed in brackets on the upper part of the side frames $b$ are two parallel bars $o$ and $o'$ upon which are slidably mounted two plates $p$, $p$, each of which is adapted to support and guide a tamping bar. The sliding connection between the plates $p$, $p$ and the supporting bars $o$, $o'$ admits of said plates and their respective tamping bars being adjusted laterally with respect to the mold, so that the bars may be properly positioned to tamp the material in molds of different diameters. Each of the tamping bars $q^2$ consists of a substantially rectangular member which is frictionally held in a metal slide $q$ which in turn is guided between flange plates $p^8$ on the outer face of the plate $p$, as shown in Figs. 6 and 8. Each of said slides $q$ is provided with two yoke-shaped end sections $q^9$ which embrace the tamping bar $q^2$, and the latter is held in frictional engagement with its slide between two leather friction pieces $q^3$, $q^3$, one of which is secured to the face of the slide and the other upon a metal wear plate $q^4$ held in the yoke pieces $q^9$ by cross pins $q^{10}$. The outer face of the metal strip $q^4$ has secured thereto two blocks $q^{11}$ which serve as abutments for a semi-elliptical spring $q^5$ which is disposed between the plate $q^4$ and a cam $q^7$ journaled in brackets $q^6$ attached to the slide, said cam being provided with a handle $q^8$ for rotating the same. When said cam is rotated to force the spring $q^5$ inward, the ends of said spring engage the abutment blocks $q^{11}$ and force the plate $q^4$ with its leather facing against the tamping bar $q^2$ so that the latter is yieldingly held by frictional engagement between the two leather facings $q^3$, $q^3$. When the cam $q^7$ is rotated to relieve the tension on the spring the tamping bar may be readily moved up and down in its slide.

In order to impart a proper reciprocatory movement to each of the tamping bars and its associated slide, each of said slides is provided on its rear face with a pintle $q'$ which projects through a vertical slot in the face of supporting plate $p$ and engages a slide block $p^7$ mounted in an opening $p^6$ in an oscillating arm or rock-lever $p^4$, which is pivoted at $p^5$ to the plate $p$, as shown in Figs. 6, 8 and 9. Oscillatory motion is imparted to arm $p^4$, to reciprocate the associated tamping bar and its slide by means of a crank disk $p'$ mounted on the end of a stub shaft $n$, said arm $p^4$ being provided with an elongated central slot in which operates a slide block $p^3$ in which is journaled the crank pin $p^2$ eccentrically disposed on the face of the disk $p'$. Two stub shafts $n$ are provided, one on each side of the machine, for operating the two tamping devices, said stub shafts being mounted in suitable journal bearings and brackets $b'$ on the side frames $b$ and each of said stub shafts having splined thereto a pinion $n'$ which admits of the respective stub shafts being slid laterally together with the plates $p$ and tamping bars $q^2$ to adjust the tamping devices for different sizes of molds. The pinions $n'$ which are secured to the stub shafts $n$, between the brackets $b'$ and the side frames $b$ mesh respectively with driving gears $m^4$, $m^4$ fast to shaft $m$ so that when said shaft is driven, each of said stub shafts $n$ is rotated, thereby imparting an oscillatory movement to the oscillating arms $p^4$, which in turn reciprocate the associated slides $q$ and clamping bars $q^2$.

The molds $s$ are preferably constructed of two sections separable longitudinally and adapted to be locked together by any appropriate means. The upper portion of each mold is provided with a bell section to give proper form to the bell end of the pipe and the lower portion of the mold is provided with a collar $s^2$ by means of which the mold is supported in vertical position in one of the rings $e^5$ of the mold carrying frame, as illustrated in Fig. 5. Below this collar the mold shell is provided with a horizontal flange $s^3$ which terminates the lower portion of the shell and has thereon a series of radially projecting fingers $s^4$ which are adapted to engage the pins $f^4$ disposed about the central opening in the charging table, as indicated in Fig. 5, whereby the mold is caused to participate in the rotatory movement of the table. The diameter of the flange $s^3$, including the fingers $s^4$ is such as to admit of the same being passed through the rings $e^5$ of the mold carrying frame.

The operation of the machine, hereinbefore described, is as follows: Normally one of the molds is located in charging position over the center of the charging table, while the other mold, in the mold carrying frame has been moved into discharging position to the front of the machine as indicated in Fig. 1. The operator by means of handle $i$ throws clutch $f^{16}$ into gear which causes shaft $f^{13}$ to be driven through gears $f^{14}$, $f^{15}$ from main shaft $d^3$, connected with the electric motor $d$. Rotation of shaft $f^{13}$ causes bevel pinion $f^{12}$ to rotate its mate $f^{11}$ to withdraw the core $f^8$ downward through the pipe section formed in the mold over the charging table, the movement of the core $f^8$ serving to smooth and finish the interior surface of the cast pipe section and the longitudinal withdrawal of the core in a downward direction serving to further compact the plastic material forming the pipe section. As the core reaches the lower end of its downward movement and is withdrawn from the mold, pin $f^{10}$ on the core engages lever $g$, rocking the same to elevate the hollow shaft $e$ a slight distance, thereby causing the upper end of said hollow shaft to engage the lower end of hollow shaft section $e^2$, by means of the engaging flanges on the respective shaft sections, and to impart a rotary movement to said shaft section $e^2$ through the frictional engagement of the flanges aforesaid. The upward movement of shaft $e$ elevates shaft section $e^2$ with its attached mold carrying frame and molds sufficiently to disengage the flange $s^3$ on the mold occupying the table from the locking pins $f^4$ on the table and the subsequent rotary movement of shaft section $e^2$ swings the mold carrying frame to a reverse position, carrying the mold with the pipe section therein, away from the table and bringing the empty mold into position over the table and in central alinement with the opening therein. At this time, hand lever $i$ is operated to disengage the members on clutch $f^{16}$ and immediately engage members of clutch $f^{20}$. As soon as the members of clutch $f^{20}$ are engaged, shaft $f^{13}$ is driven by sprocket gearing $f^{17}$, $f^{18}$ and $f^{19}$ from shaft $d^3$ and bevel gears $f^{12}$ and $f^{11}$ move the core $f^8$ in the opposite direction to lift the same. The preliminary lifting movement of the core has the effect of disengaging pin $f^{10}$ from lever $g$ thereby permitting shaft $e$ to drop carrying with it shaft section $e^2$ and lowering the mold carrying frame until the mold over the charging table engages with lugs $s^4$ on the lower flange thereof, with the pins $f^4$ on the table and locks the mold to the table. The downward movement of the shaft $e$ disengages said shaft from the upper shaft section $e^2$ and the latter stands idle in the supporting bracket $f^2$. The continued driving of shaft $f^{13}$ serves to lift the core $f^8$ until the latter is brought into proper longitudinal alinement within the mold $s$ located on the charging table. Hand lever $i$ is then moved to off position, thereby disengaging the members of clutch $f^{20}$ and suspending the rotation of shaft $f^{13}$. The apparatus is now ready for the next molding operation to effect which hand lever $j$ is moved by the operator to engage members of clutch $j^3$ which locks shaft $h'$ to bevel gear $h$ which is constantly driven by bevel pinion $d^5$ on shaft $d^3$. The rotation of shaft $h'$ causes the movable portion of the charging table $f'$ and $f^3$ to be revolved by means of the pinion $h^2$ engaging the toothed flange $f^6$ on the table section $f'$, thereby causing the mold $s$ mounted on the table to rotate with the latter. At the same time the operator engages belt pulley $m'$ with a suitable prime mover, thereby causing said pulley to drive its connected shaft $m$. The rotation of shaft $m$ drives countershaft $l$ by means of the stepped pulleys $m^2$, $l'$ and belt $m^3$, and said countershaft $l$ drives the feed screw $k^2$ in the hopper chute $k'$ through meshing bevel gears $l^2$ and $k^6$, shaft $k^5$ and meshing gears $k^4$, $k^4$. The movement of the feed screw $k^2$ causes the material to be delivered from hopper $k$ along spout $k'$ into the mold.

Should it be found necessary to adjust the position of the hopper to properly deliver the material into the mold, as for example when a larger or a smaller pipe section is being formed, the hopper is moved from or toward the central axis of the charging table on its supporting bracket $b^2$ and, inasmuch as the shaft $k^5$ is splined to the hub of gear $k^6$, said shaft while sliding with the hopper always maintains its driving connection with its pinion $k^6$.

Prior to starting the charging operation, the tamping devices are adjusted in proper position with respect to the mold, that is to say, the bars $q$ are adjusted to stand over the mold on opposite sides of the core and between the latter and the inner walls of the mold. To effect this adjustment the plates $p$ carrying the tamping bars are slid along the supporting bars $o$ until each of the tamping bars is set to the desired adjustment. It will be evident that the tamping bars may therefore be adjusted to coöperate with molds of varying sizes, from the largest to the smallest, within the capacity of the machine.

The tamping operation is carried on simultaneously with the charging of the material into the mold. The tamping bars are lowered into the mold by operating the handles $q^8$ connected with the cams $q^7$ which release springs $q^5$ relieving the tension on the leather friction grips $q^3$, $q^3$ carried by the respective slides of the bars, thereby permitting the bars to drop. The handles $q^8$ are then swung into their lower positions causing the cams $q^7$ to put the springs $q^5$ under tension, thereby binding the respective clamping bars to the slides by the frictional engagement of the leather gripping strips $q^3$.

The stub shafts $n$, which serve to operate the tamping bars, are slidably mounted in bearings on the side frames $b$, as hereinbefore explained, and partake of the lateral movement of the rest of the tamping mechanisms, including the plates $p$. Pinions $n'$ which are splined to the stub shafts $n$ are driven by gears $m^4$, $m^4$, which are mounted on the shaft $m$, so that both of said stub shafts $n$ are rotated whenever shaft $m$ is driven. The rotation of each of said shafts $n$ causes the vertical oscillation of the pivoted arm $e^4$ on the corresponding plate $p$ through crank disk $p'$, crank pin $p^2$, and slide $p^3$, and this oscillatory movement of arm $p^4$ causes a reciprocatory movement of the connected tamping bar slide $q$ as hereinbefore explained. The reciprocation of the tamping bars effects the proper and necessary compacting of the plastic material fed into the mold to form the pipe section. As the depth of the material fed into the mold increases the frictional engagement between the tamping bars and the leather facing plates carried by their slides, admits of the automatic adjustment of the bars in their slides to compensate for the varying levels of the material in the molds and causes the tamping bars to move upward in their slides as the mold gradually fills up so as to insure the ends of the bars operating on the top of the material.

After the mold has been run full of the material to form the pipe and said material has been thoroughly tamped by the bars, in the manner aforesaid, the feeding and tamping operation is suspended by stopping the drive pulley $m'$. The completed pipe section is now ready for removal and the operation hereinbefore explained is repeated, namely the lever $i$ is actuated to start the mechanism to withdraw the core $f^3$ downward through the mold and the pipe section therein, the vertical and longitudinal movement of the core serving to smooth the interior walls of the pipe and further compact the material therein, and also freeing the upper portion of the core constituting the core for the bell or mouth section of the pipe and leaving the same free in the mold for subsequent removal. After the core has been completely withdrawn, the mold carrying table is swung about through 180° as hereinbefore explained and the mold carrying the finished pipe brought into discharging position and an empty mold is moved into charging position.

What I claim is:

1. A molding machine for pipes and the like, comprising a rotary charging table, a mold detachably secured thereto, a mold carrying frame adjacent to said table and having swiveled connection with said mold permitting said mold to rotate about its own axis, means for intermittently rotating, raising and lowering said frame with respect to said table, a core movable through said table longitudinally of a mold thereon, and means for rotating said charging table.

2. A molding machine for pipes and the like, comprising a rotary charging table, a mold detachably secured thereto, a mold carrying frame adjacent to said table and having swiveled connection with said mold permitting said mold to rotate about its longitudinal axis, means for intermittently rotating, raising and lowering said frame with respect to said table, a downwardly retractable core movable through said table longitudinally of a mold thereon, and means for rotating said table.

3. A molding machine for pipes and the like, comprising a rotary charging table a mold carrying frame, a plurality of molds carried by said frame, each of said molds being connected to said frame so as to be capable of independent rotation about its own axis, means for intermittently rotating, raising and lowering said frame with respect to said table, means for securing a mold to said table, a core movable through the table and into the mold thereon, and means for imparting longitudinal movement to said core to position the core in the mold and withdraw said core downwardly from the mold.

4. A molding machine for pipes and the like, comprising a rotary charging table, a mold carrying frame, a plurality of molds carried thereby, each of said molds being capable of independent rotation about its own axis with respect to said frame, means for intermittently rotating, raising and lowering said frame with respect to said table, means for securing a mold to said table, means for rotating said table, a core movable through the table and into the mold therein, and reversing gearing for imparting longitudinal movement to said core to position the core in the mold and withdraw said core downwardly from the mold respectively.

5. A molding machine for pipes and the like, comprising a rotary charging table, a mold carrying frame having a plurality of molds swiveled thereon so as to be independently rotatable about their longitudinal axes, means for intermittently rotating, raising and lowering said frame to remove a filled mold from and to centrally position an empty mold on said table, a downwardly retractable core passing through the table and ino the mold thereon, and means operable by the core in its lower position to actuate the mold carrying frame as aforesaid.

6. A molding machine for pipes and the like, comprising a rotary charging table, a mold carrying frame having molds mounted thereon for independent rotation about their vertical axes, means for securing a mold to said table, means for rotating said table and the mold secured thereto, a rotary vertically movable shaft coöperating with the mold frame to rotate, raise and lower the same with respect to the charging table, a vertically movable core passing through the table longitudinally of a mold thereon, and means operable by the core in its lower position to raise said rotary shaft and actuate the mold carrying frame as aforesaid.

7. A molding machine for pipes and the like, comprising a rotary charging table, means for rotating said table, a horizotnally rotatable mold carrying frame having molds swiveled thereon for independent rotary movement about their longitudinal axes, means for securing a mold to said table so as to cause it to rotate therewith, and means for intermittently rotating, raising and lowering said mold carrying frame to remove a filled mold from the charging table and position an empty mold on said table.

8. A molding machine for pipes and the like, comprising a rotary charging table, a horizontally rotatable mold carrying frame having molds swiveled thereon for independent rotary movement about their longitudinal axes, means for intermittently rotating, raising and lowering said mold carrying frame to remove a filled mold from the charging table and position an empty mold on said table, means for securing the last mentioned mold to the rotary charging table, and means for rotating said table and the mold secured thereto.

9. A molding machine for pipes and the like, comprising a rotary charging table, a vertical column carrying an operator's platform adjacent said table, a mold carrying frame journaled on said column for rotary movement about said platform to move the molds to and from the charging table, and means for intermittently rotating, raising and lowering said mold carrying frame.

10. A molding machine for pipes and the like, comprising a rotary charging table having a removable central section to accommodate molds of different sizes, a mold carrying frame, a plurality of molds mounted on said frame and independently rotatable with respect thereto, means for rotating, raising and lowering said frame with respect to the charging table, and means for rotating said table.

11. A molding machine for pipes and the like, comprising a rotary charging table having a removable central section to accommodate molds of different sizes, a mold carrying frame, a plurality of molds mounted on said frame and independently rotatable with respect thereto, means for rotating, raising and lowering said frame with respect to the charging table, means for separately securing each of said molds to said rotary table, a vertically movable core adapted to be withdrawn downward from the mold on the table, means for raising and lowering the core, and means actuated by said core in its lower position for operating the mold carrying frame as aforesaid.

12. A molding machine for pipes and the like, comprising a rotary charging table, a rotary mold carrying frame, a plurality of molds mounted for independent rotation in said frame, means for intermittently rotating, raising and lowering the mold carrying frame with respect to the charging table to move the molds to and from the table aforesaid, means for securing a mold to the table, a core passing centrally through the table, means for successively moving the core into the mold and withdrawing the same downwardly therefrom, a feed hopper carried by the machine frame and laterally adjustable with respect to the charging table, a plurality of tamping bars for compacting the material fed to the mold, laterally adjustable frictional supports for said bars, and means for reciprocating said bars.

In testimony whereof I affix my signature, in the presence of two subscribing witnesses.

THOMAS W. HAMMOND, Jr.

Witnesses:
E. R. York,
T. W. Hammond.

Copies of this patent may be obtained for five cents each, by addressing the "Commissioner of Patents, Washington, D. C."